United States Patent
Park

(10) Patent No.: US 11,314,036 B2
(45) Date of Patent: Apr. 26, 2022

(54) LIQUID LENS, AND CAMERA MODULE AND OPTICAL INSTRUMENT INCLUDING SAME

(71) Applicant: LG INNOTEK CO., LTD., Seoul (KR)

(72) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 126 days.

(21) Appl. No.: 16/492,518

(22) PCT Filed: Mar. 9, 2018

(86) PCT No.: PCT/KR2018/002801
§ 371 (c)(1),
(2) Date: Sep. 9, 2019

(87) PCT Pub. No.: WO2018/164524
PCT Pub. Date: Sep. 13, 2018

(65) Prior Publication Data
US 2021/0141187 A1    May 13, 2021

(30) Foreign Application Priority Data
Mar. 10, 2017  (KR) .......................... 10-2017-0030605

(51) Int. Cl.
*G02B 7/02*  (2021.01)
*G02B 3/14*  (2006.01)
(Continued)

(52) U.S. Cl.
CPC ............... *G02B 7/028* (2013.01); *G02B 3/14* (2013.01); *G02B 26/004* (2013.01);
(Continued)

(58) Field of Classification Search
CPC ........ G02B 7/028; G02B 3/14; G02B 26/004; G02B 27/646; G02B 26/005; G02B 7/28; G03B 5/00; G03B 2205/0007
See application file for complete search history.

(56) References Cited

U.S. PATENT DOCUMENTS

2005/0041301 A1   2/2005 Kibayashi
2006/0067663 A1*  3/2006 Kita ......................... G03B 3/10
                                                 396/72
(Continued)

FOREIGN PATENT DOCUMENTS

CN    1705901 A    12/2005
CN    1784625 A     6/2006
(Continued)

OTHER PUBLICATIONS

Machine Translation of JPH 08211208 (Year: 1996).*

*Primary Examiner* — Darryl J Collins
*Assistant Examiner* — Matthew Y Lee
(74) *Attorney, Agent, or Firm* — Birch, Stewart, Kolasch & Birch, LLP

(57) ABSTRACT

A liquid lens, which forms one optical system together with a solid lens, according to an embodiment, comprises: a first plate in which a cavity for accommodating a conductive liquid and a non-conductive liquid is arranged; a first electrode arranged on the first plate; a second electrode arranged under the first plate; a second plate arranged on the first electrode; and a third plate arranged under the second electrode, wherein a total volume of the conductive liquid and the non-conductive liquid and an area in which the lower surface of the second plate comes in contact with the conductive liquid can be designed so as to meet specific conditions.

19 Claims, 5 Drawing Sheets

(51) Int. Cl.
*G02B 26/00* (2006.01)
*G02B 27/64* (2006.01)
*G03B 5/00* (2021.01)

(52) U.S. Cl.
CPC ............. *G02B 27/646* (2013.01); *G03B 5/00* (2013.01); *G03B 2205/0007* (2013.01)

(56) References Cited

U.S. PATENT DOCUMENTS

| | | |
|---|---|---|
| 2006/0256448 A1 | 11/2006 | Oh et al. |
| 2007/0091288 A1 | 4/2007 | Lin et al. |
| 2009/0190232 A1* | 7/2009 | Craen .................. G02B 3/14 |
| | | 359/666 |
| 2012/0261474 A1* | 10/2012 | Kawashime ........... G02B 7/32 |
| | | 235/462.24 |

FOREIGN PATENT DOCUMENTS

| | | |
|---|---|---|
| CN | 1866056 A | 11/2006 |
| CN | 1947036 A | 4/2007 |
| CN | 102341737 A | 2/2012 |
| CN | 102466825 A | 5/2012 |
| CN | 102656484 A | 9/2012 |
| CN | 103487933 A | 1/2014 |
| CN | 104780302 A | 7/2015 |
| CN | 204496040 U | 7/2015 |
| CN | 105223635 A | 1/2016 |
| CN | 205318000 U | 6/2016 |
| EP | 1 724 614 A1 | 11/2006 |
| EP | 2 495 593 A1 | 9/2012 |
| EP | 2 837 957 A1 | 2/2015 |
| FR | 2 769 375 A1 | 4/1999 |
| JP | 8-211208 A | 8/1996 |
| JP | H 08211208 * | 8/1996 ............... G02B 3/14 |
| JP | 2005-62632 A | 3/2005 |
| JP | 2007-183635 A | 7/2007 |
| JP | 4798013 B2 | 10/2011 |
| JP | 2012-108428 A | 6/2012 |
| KR | 10-2006-0118266 A | 11/2006 |
| KR | 10-0674866 B1 | 1/2007 |
| KR | 10-0847804 B1 | 8/2008 |
| KR | 10-1629772 B1 | 6/2016 |
| WO | WO 01/22148 A1 | 3/2001 |
| WO | WO 03/069380 A1 | 8/2003 |
| WO | WO 2004/099845 A1 | 11/2004 |
| WO | WO 2007/058451 A1 | 5/2007 |
| WO | WO 2016/174181 A2 | 11/2016 |
| WO | WO 2018/013375 A1 | 1/2018 |

* cited by examiner

【FIG. 1】
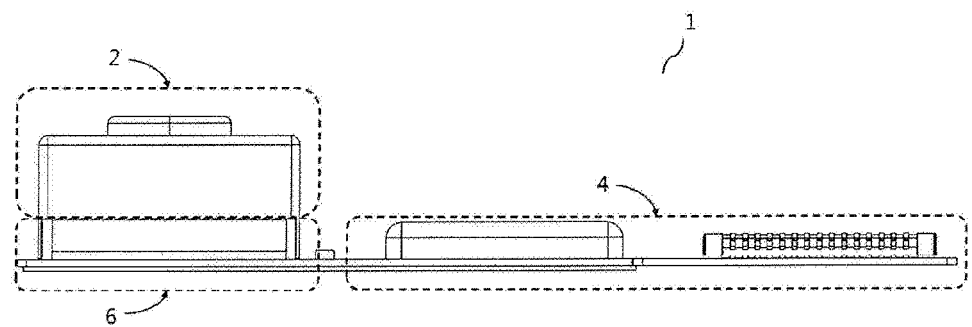
【FIG. 2】
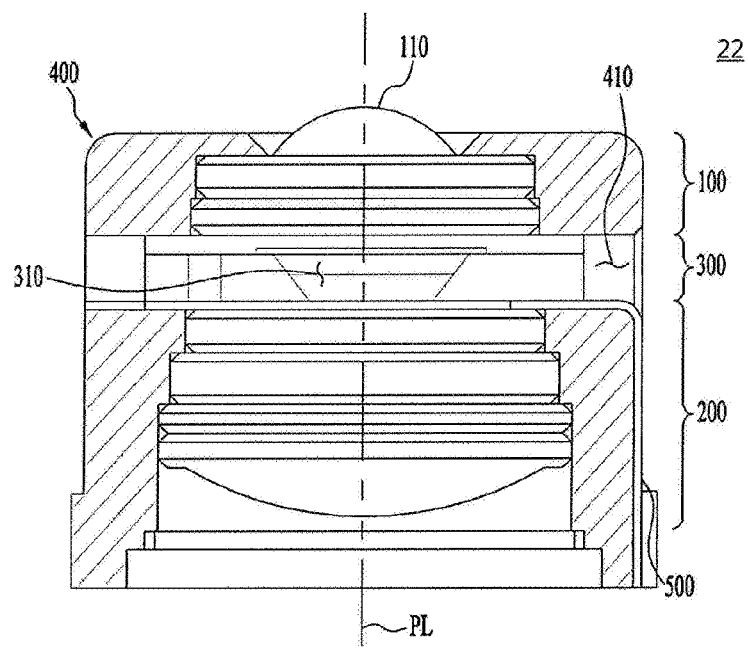

【FIG. 3】
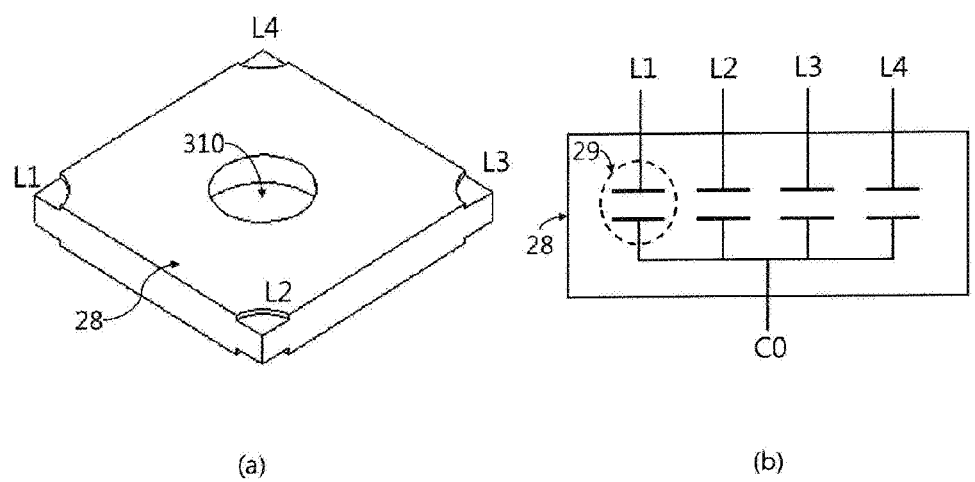
(a)    (b)
【FIG. 4a】
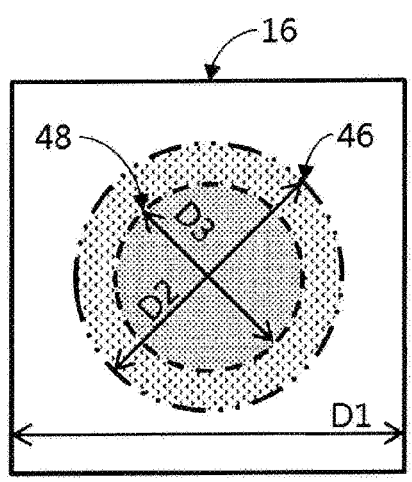

【FIG. 4b】
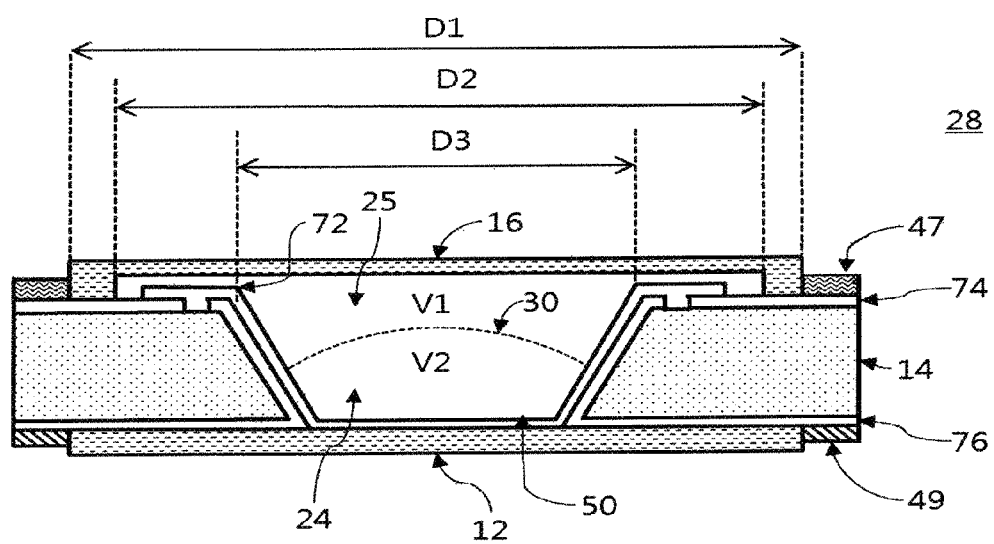
【FIG. 5a】
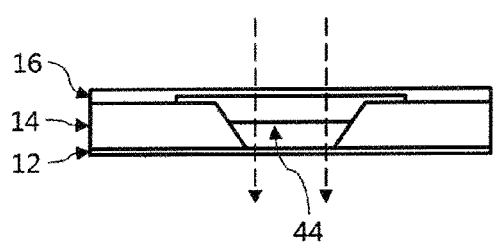

[FIG. 5b]
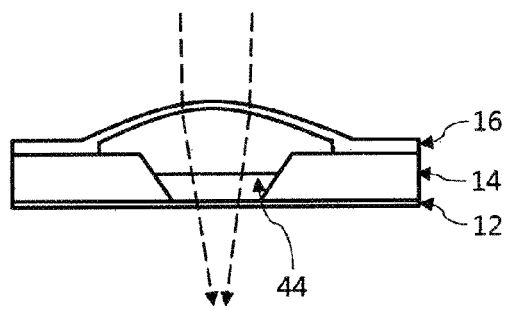
[FIG. 6a]
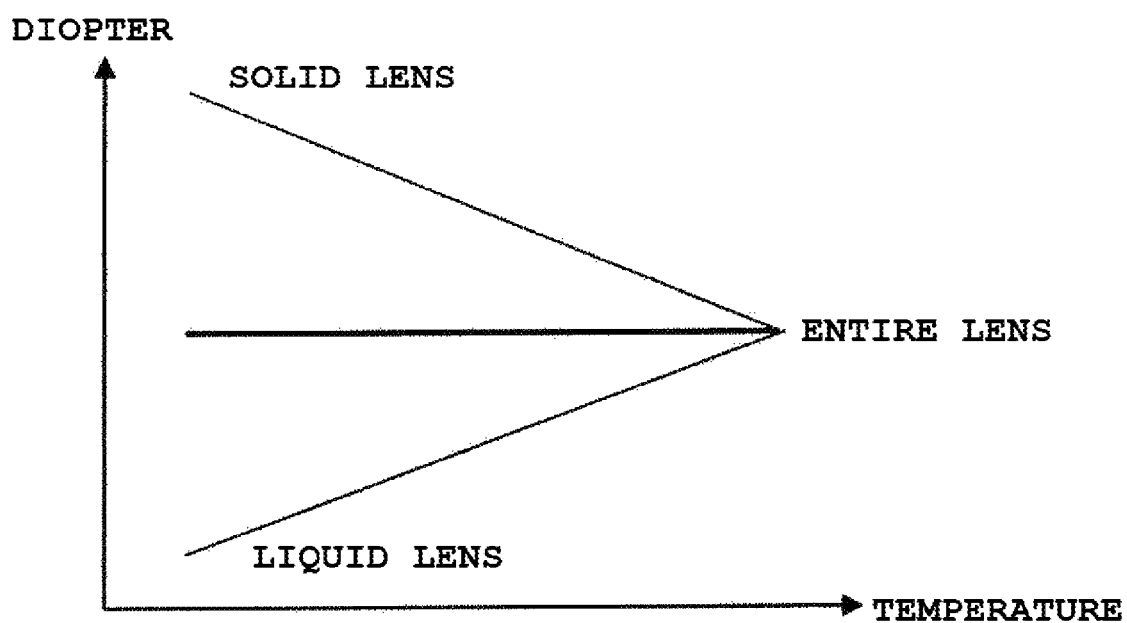

[FIG. 6b]
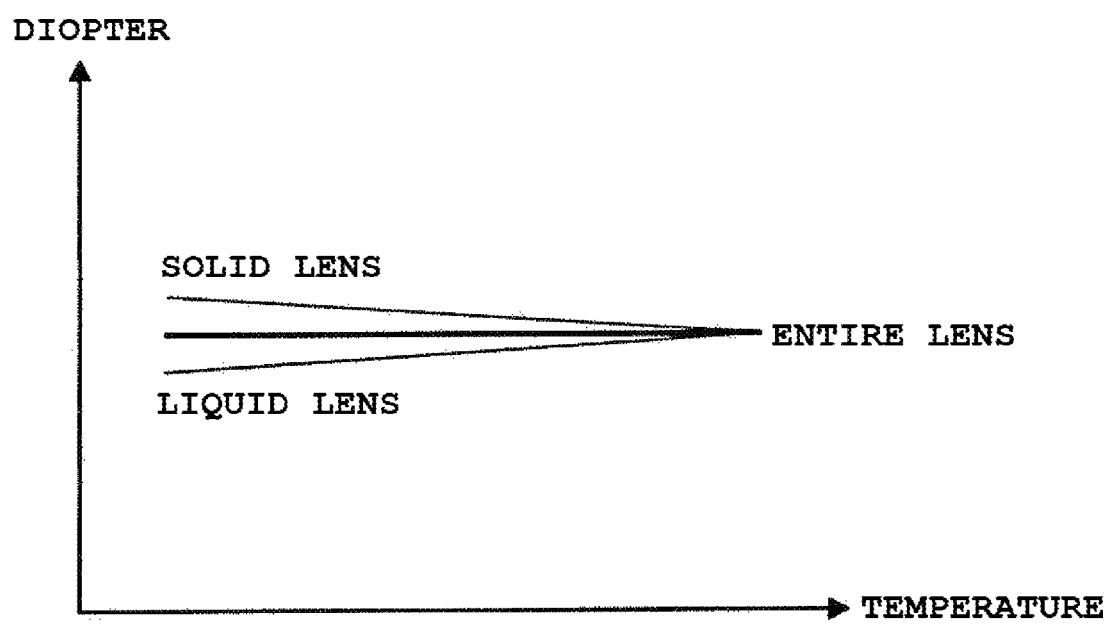

LIQUID LENS, AND CAMERA MODULE AND OPTICAL INSTRUMENT INCLUDING SAME

CROSS REFERENCE TO RELATED APPLICATIONS

This application is the National Phase of PCT International Application No. PCT/KR2018/002801, filed on Mar. 9, 2018, which claims priority under 35 U.S.C. 119(a) to Patent Application No. 10-2017-0030605, filed in the Republic of Korea on Mar. 10, 2017, all of which are hereby expressly incorporated by reference into the present application.

TECHNICAL FIELD

Embodiments relate to a liquid lens, a camera module including the same, and an optical device. More particularly, embodiments relate to a lens capable of reducing the occurrence of a change in diopter due to the deformation of a structure, which contains a liquid included in a liquid lens, during thermal expansion of the liquid according to a change in temperature.

BACKGROUND ART

People who use portable devices demand optical devices that have high resolution, are small, and have various photographing functions (e.g. an autofocus (AF) function, a hand-tremor compensation or optical image stabilization (OIS) function, etc.). Such photographing functions may be realized by directly moving a plurality of lenses that are combined. In the case in which the number of lenses is increased, however, the size of an optical device may be increased. The autofocus and hand-tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens-moving apparatus is used to move the lens module.

However, the lens-moving apparatus consumes a lot of power, and an additional cover glass needs to be provided separately from the camera module in order to protect the lens-moving apparatus, thus leading to an increase in the overall thickness of the optical device. Therefore, research has been conducted on a liquid lens configured to electrically adjust the curvature of an interface between two kinds of liquid in order to perform autofocus and hand-tremor compensation functions.

DISCLOSURE

Technical Problem

Embodiments may provide a lens enabling adjustment of a focal length using electrical energy and capable of compensating for a change in diopter due to the deformation of a structure, which contains a liquid included in the lens, according to a change in temperature, and a camera module including the lens.

However, the objects to be accomplished by the disclosure are not limited to the above-mentioned objects, and other objects not mentioned herein will be clearly understood by those skilled in the art from the following description.

Technical Solution

In one embodiment, a liquid lens, which forms one optical system together with a solid lens, may include a first plate including a cavity formed therein to accommodate a conductive liquid and a non-conductive liquid therein, a first electrode disposed on the first plate, a second electrode disposed under the first plate, a second plate disposed on the first electrode, and a third plate disposed under the second electrode. The total volume (LV) of the conductive liquid and the non-conductive liquid and the area (A) of the lower surface of the second plate that contacts the conductive liquid may satisfy Equation 1 below.

$$3\ LV \leq A \leq 15\ LV \quad \text{[Equation 1]}$$

In some embodiments, when the temperature increases, the diopter of the liquid lens may change in a direction opposite the direction in which a diopter of the solid lens changes.

In some embodiments, the area (A) of the lower surface of the second plate may be an area calculated when the second plate is flat.

In some embodiments, the diopter of the solid lens may decrease with an increase in temperature, and the diopter of the liquid lens may increase with an increase in temperature.

In some embodiments, variation in the diopter of the entire lens, including the liquid lens and the solid lens, may be no more than 1 diopter within a temperature range of 25 degrees Celsius to 60 degrees Celsius.

In another embodiment, a lens assembly may include at least one solid lens and a liquid lens forming one optical system together with the solid lens and having a configuration in which an interface between a conductive liquid and a non-conductive liquid is controlled. The liquid lens may include a first plate including a cavity formed therein to accommodate the conductive liquid and the non-conductive liquid therein, a first electrode disposed on the first plate, a second electrode disposed under the first plate, a second plate disposed on the first electrode, and a third plate disposed under the second electrode. The diopter of the solid lens may decrease with an increase in temperature, and the diopter of the liquid lens may increase with an increase in temperature.

In some embodiments, the total volume (LV) of the conductive liquid and the non-conductive liquid and the area (A) of the lower surface of the second plate that contacts the conductive liquid may satisfy Equation 1 below.

$$3\ LV \leq A \leq 15\ LV \quad \text{[Equation 1]}$$

In some embodiments, within a temperature range of 25 degrees Celsius to 60 degrees Celsius, the absolute value of variation in the diopter of the liquid lens may be greater than the absolute value of variation in the diopter of the solid lens.

In some embodiments, variation in the diopter of the entire lens, including the liquid lens and the solid lens, may be no more than 1 diopter within a temperature range of 25 degrees Celsius to 60 degrees Celsius.

In still another embodiment, a camera module may include the above-described lens assembly and a control circuit configured to control the interface between the conductive liquid and the non-conductive liquid.

However, the above aspects of the present disclosure are only a part of the exemplary embodiments of the present disclosure, and various embodiments based on the technical features of the present disclosure may be devised and understood by those skilled in the art from the following detailed description of the present disclosure.

Advantageous Effects

The effects of a device according to the embodiments will be described below.

According to a liquid lens, a camera module including the same, and an optical device according to the embodiments, the liquid lens is designed so as to have temperature-dependent diopter change characteristics capable of offsetting a change in the diopter of a solid lens group depending on a change in temperature. As a result, the diopter of the entire lens may be maintained uniform regardless of temperature.

However, the effects achievable through the disclosure are not limited to the above-mentioned effects, and other effects not mentioned herein will be clearly understood by those skilled in the art from the following description.

DESCRIPTION OF DRAWINGS

The accompanying drawings, which are included to provide a further understanding of the disclosure, illustrate embodiments of the disclosure together with the detailed description. The technical features of the disclosure are not limited to specific drawings, and the features shown in the drawings may be combined to construct new embodiments.

FIG. 1 is a cross-sectional view of a camera module according to an embodiment.

FIG. 2 is a cross-sectional view of one example of a lens assembly included in the camera module.

FIG. 3 illustrates a lens, the interface of which is adjusted in response to a driving voltage.

FIGS. 4a and 4b illustrate one example of a liquid lens.

FIGS. 5a and 5b illustrate the characteristics of the liquid lens shown in FIGS. 4a and 4b depending on a change in temperature.

FIG. 6a is a view showing one example of a change in the diopter of a solid lens depending on a change in temperature and a liquid lens for compensating for the change in the diopter.

FIG. 6b is a view showing another example of a change in the diopter of a solid lens depending on a change in temperature and a liquid lens for compensating for the change in the diopter.

BEST MODE

Reference will now be made in detail to the embodiments, examples of which are illustrated in the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

FIG. 1 is a cross-sectional view of a camera module 1 according to an embodiment.

Referring to FIG. 1, the camera module 1 may include a lens assembly 2, which includes a liquid lens and a plurality of lenses, a control circuit 4, and an image sensor 6.

The liquid lens included in the lens assembly 2 is adjusted in focal length corresponding to a driving voltage applied between a common electrode and each of a plurality of individual electrodes.

The control circuit 4 transmits a signal for supplying the driving voltage to the liquid lens. The image sensor 6 is aligned with the lens assembly 2 and converts the light transmitted through the lens assembly 2 into an electrical signal.

The camera module 1 may include a plurality of circuits 4 and 6, disposed on a single printed circuit board (PCB), and a lens assembly 2, including a plurality of lenses. However, this is merely illustrative, and the disclosure is not limited thereto. The configuration of the control circuit 4 may be designed differently in accordance with the specifications required for an optical device. In particular, in order to reduce the intensity of the operating voltage applied to the lens assembly 2, the control circuit 4 may be implemented as a single chip. As a result, it is possible to further reduce the size of the camera module that is mounted in a portable device.

FIG. 2 is a cross-sectional view of one example 22 of the lens assembly 2 included in the camera module 1.

Referring to FIG. 2, the lens assembly 2 and 22 may include a first lens unit 100, a second lens unit 200, a liquid lens unit 300, a holder 400, and a connection unit 500. The illustrated structure of the lens assembly 2 and is just one example, and the structure of the lens assembly 2 and 22 may be changed depending on the specifications required for the camera module. For example, in the illustrated example, the liquid lens unit 300 is disposed between the first lens unit 100 and the second lens unit 200. However, in another example, the liquid lens unit 300 may be disposed on the first lens unit 100 (or on the front surface of the first lens unit), and the second lens unit 200 may be omitted.

The first lens unit 100 is disposed at the front side of the lens assembly 2 and 22, and receives light from the outside of the lens assembly 2 and 22. The first lens unit 100 may include at least one lens, or two or more lenses may be aligned along a center axis PL to form an optical system.

The first lens unit 100 and the second lens unit 200 may be mounted in the holder 400. Here, a through-hole may be formed in the holder 400, and the first lens unit 100 and the second lens unit 200 may be disposed in the through-hole. Further, the liquid lens unit 300 may be inserted into the space between the first lens unit 100 and the second lens unit 200 in the holder 400.

Meanwhile, the first lens unit 100 may include an exposure lens 110. Further, the exposure lens 110 may protrude to the outside of the holder 400. The surface of the exposure lens 110 may be damaged due to exposure thereof to the outside. If the lens surface is damaged, the quality of the image captured by the camera module may be deteriorated. In order to prevent or minimize damage to the surface of the exposure lens 110, a cover glass (not shown) may be disposed, a coating layer (not shown) may be formed, or the exposure lens 110 may be made of a wear-resistant material to prevent damage to the surface thereof.

The second lens unit 200 may be disposed at the rear of the first lens unit 100 and the liquid lens unit 300, and the light incident on the first lens unit 100 from the outside may pass through the liquid lens unit 300 and may be incident on the second lens unit 200. The second lens unit 200 may be spaced apart from the first lens unit 100 and may be disposed in the through-hole formed in the holder 400.

Meanwhile, the second lens unit 200 may include at least one lens, and when two or more lenses are included, the lenses may be aligned along the center axis PL to form an optical system.

The liquid lens unit 300 may be disposed between the first lens unit 100 and the second lens unit 200, and may be inserted into an insertion hole 410 formed in the holder 400. The liquid lens unit 300 may also be aligned along the center axis PL in the same manner as the first lens unit 100 and the second lens unit 200.

The liquid lens unit 300 may include a lens region 310. The lens region 310 may be a region that light that has passed through the first lens unit 100 penetrates, and may include a liquid in at least a portion thereof. For example, two kinds of liquid, i.e. a conductive liquid and a non-conductive liquid, may be included in the lens region 310, and the conductive liquid and the non-conductive liquid may form an interface therebetween without being mixed with each other. The interface between the conductive liquid and the non-conductive liquid may be deformed by a driving voltage applied thereto through the connection unit 500, whereby the curvature and/or the focal length of the liquid lens unit 300 may be changed. When the deformation of the interface and the change in the curvature thereof are controlled, the liquid lens unit 300, the lens assembly 2 and 22 including the same, and the camera module 1 may perform an autofocus (AF) function, a hand-tremor compensation or optical image stabilization (OIS) function, etc.

FIGS. 3(*a*) and 3(*b*) illustrate a lens, the interface of which is adjusted in response to a driving voltage. Specifically, FIG. 3(*a*) illustrates a liquid lens 28 included in the lens assembly 22 (refer to FIG. 2), and FIG. 3(*b*) illustrates an equivalent circuit of the liquid lens 28 shown in FIG. 3(*a*).

First, referring to FIG. 3(*a*), the liquid lens 28, the interface of which is adjusted in response to a driving voltage, may receive driving voltages via a plurality of individual electrodes L1, L2, L3 and L4, which are disposed in four different directions. The plurality of individual electrodes may be disposed at a regular angular interval from each other. When driving voltages are applied to the liquid lens via the individual electrodes L1, L2, L3 and L4, the interface between the conductive liquid and the non-conductive liquid disposed in the lens region 310 may be deformed by the interaction with the voltage applied to the common electrode, which will be described later. The degree and type of deformation of the interface between the conductive liquid and the non-conductive liquid may be controlled by the control circuit 4 in order to realize an AF function or an OIS function.

Further, referring to FIG. 3(*b*), the liquid lens 28 may be defined as a plurality of capacitors 29, one side of each of which receives a driving voltage from a corresponding one of the individual electrodes L1, L2, L3 and L4, and the other side of each of which is connected to the common electrode CO.

Although an embodiment in which four individual electrodes are provided is described by way of example in this specification, the disclosure is not limited thereto.

FIGS. 4*a* and 4*b* illustrate one example of the liquid lens. Specifically, FIG. 4*a* is a top view of one example of the liquid lens, and FIG. 4*b* is a cross-sectional view of one example of the liquid lens.

Referring to FIGS. 4*a* and 4*b*, the liquid lens may include two different liquids, a first plate 14, and an electrode.

The two liquids 25 and 24 included in the liquid lens may include a conductive liquid and a non-conductive liquid. The first plate 14 may include a cavity 50 in which the conductive liquid and the non-conductive liquid are disposed. The side wall of the cavity 50 may include an inclined surface. The electrode may be disposed on the first plate 14, or may be disposed under the first plate 14. The liquid lens may further include a second plate 16, which may be disposed on (or under) the electrode. In addition, the liquid lens may further include a third plate 12, which may be disposed under (or on) the electrode. As illustrated, one example of the liquid lens 28 may include an interface 30 formed by the two different liquids 25 and 24. In addition, the liquid lens 28 may include at least one substrate 47 and 49, which supplies a voltage to the liquid lens 28. The corners of the liquid lens 28 may be thinner than the center portion of the liquid lens 28.

The liquid lens 28 may include two different liquids, namely the conductive liquid 25 and the non-conductive liquid 24, and the curvature and the shape of the interface 30 formed by the two liquids may be adjusted by varying the driving voltage supplied to the liquid lens 28. The driving voltage supplied to the liquid lens 28 may be transmitted through the first substrate 49 and the second substrate 47. The first substrate 49 may serve to transmit four distinct individual driving voltages, and the second substrate 47 may serve to transmit a common voltage. The common voltage may include a DC voltage or an AC voltage. In the case in which the common voltage is applied in a pulse form, the width of the pulse or the duty cycle thereof may be uniform. The voltages supplied through the second substrate 47 and the first substrate 49 may be applied to a plurality of electrodes 74 and 76 exposed at the respective corners of the liquid lens 28. A conductive epoxy may be disposed between the electrodes and the board, and the electrodes and the board may be coupled and electrically connected to each other via the conductive epoxy.

In addition, the liquid lens 28 may include the first plate 14. The first plate 14 may be located between the third plate 12 and the second plate 16, which include a transparent material, and may include an open region having a predetermined inclined surface.

The second plate 16 may be a rectangular shape having a first width D1. The second plate 16 may be in contact with and bonded to the first plate 14 in the bonding region near the edges thereof. The first plate 14 may encompass a diameter D2 of a peripheral region 46, which is greater than the diameter D3 of a large open region 48 having the inclined surface. The peripheral region 46 may be a region that overlaps the upper surface of the first plate 14 and the liquid in an upward-and-downward direction or in a direction parallel to the optical axis. A portion of the first electrode 74 that is disposed on the first plate 14 may be exposed to contact the cavity 50. The reason for this is that some of the electrode patterns formed on the first plate 14 need to be exposed to the conductive liquid. Accordingly, according to the embodiment, the second plate 16 may include a peripheral region 46, which has a diameter D2 greater than the diameter D3 of the large open region in the first plate 14 and is spaced apart from the first plate 14.

The area of the peripheral region 46 may be defined as a cross-sectional area A. In the case in which the peripheral region 46 is a circular shape, the cross-sectional area A of the peripheral region 46 having the diameter D2 may be calculated by multiplying 7C by the square of half (that is, radius) of the diameter D2. However, in some embodiments, the peripheral region 46 may not be a circular shape, and accordingly the calculation of the cross-sectional area A thereof may vary.

The actual effective lens region of the liquid lens 28 may be smaller than the diameter D3 of the large open region in the first plate 14. For example, in the case in which light is actually transmitted through a path defined by a small-diameter region about the center portion of the liquid lens 28, the diameter D2 of the peripheral region 46 of the second plate 16 may be smaller than the diameter D3 of the large open region in the first plate 14.

In addition, the liquid lens 28 may include a cavity 50, which is defined by the third plate 12, the second plate 16, and the open region in the first plate 14. Here, the cavity 50 may be filled with two liquids 25 and 24 having different properties (e.g. a conductive liquid and a non-conductive liquid), and an interface 30 may be formed between the two liquids 25 and 24 having different properties.

Here, the volume of the conductive liquid 25 is defined as a first volume V1, and the volume of the non-conductive liquid 24 is defined as a second volume V2. In addition, the sum of the volume of the conductive liquid 25 and the volume of the non-conductive liquid 24, i.e. the sum of the first volume V1 and the second volume V2, may be defined as a liquid volume LV. When the cavity 50 is completely filled with the conductive liquid 25 and the non-conductive liquid 24 without an unfilled space therein, the liquid volume LV may be the same as the volume of the cavity 50.

Further, at least one of the two liquids 25 and 24 included in the liquid lens 28 may be conductive, and the liquid lens 28 may further include an insulation layer 72, which is disposed on the two electrodes 74 and 76 respectively disposed on and under the first plate 14, and on the inclined surface, which may come into contact with the conductive liquid. The insulation layer 72 may be disposed between the inner inclined surface of the first plate 14 and the liquids 25 and 24. Here, the insulation layer 72 may cover one (e.g. the second electrode 76) of the two electrodes 74 and 76, and may expose a portion of the other one (e.g. the first electrode 74) of the two electrodes 74 and 76 so that electrical energy is applied to the conductive liquid (e.g. 25). Here, the first electrode 74 may include at least one electrode sector, and the second electrode 76 may include two or more electrode sectors. For example, the second electrode 76 may include a plurality of electrode sectors, which are sequentially disposed in the clockwise direction about the optical axis.

One or two or more substrates 47 and 49 may be connected to the two electrodes 74 and 76 included in the liquid lens 28 in order to transmit a driving voltage thereto. The curvature and the inclination of the interface 30 formed in the liquid lens 28 may be changed in response to the driving voltage, whereby the focal length of the liquid lens 28 may be adjusted.

Referring to FIG. 4b, the center portion of the second plate 16, which corresponds to the open region 48, and the peripheral region 46 thereof may have the same thickness and may be flat. The thickness of each of the center portion and the peripheral region 46 of the second plate 16 may be less than the thickness of the bonding region near the edge thereof that is coupled to the first plate 14. The center portion or the center region may be a region that encompasses the optical axis and is surrounded by the peripheral region 46.

The first plate 14 may include an open region 48, which includes a large open region and a small open region due to the inner inclined surface of the first plate 14. The diameter D3 of the large open region 48 may vary depending on the field of view (FOV) required for the liquid lens or the role of the liquid lens in the camera module. The open region 48 may be formed in the shape of a hole having a circular cross-section. The inclined surface of the open region 48 may be inclined at an angle of 55° to 65°. The interface 30 formed by the two liquids may move along the inclined surface of the open region 48.

FIGS. 5a and 5b illustrate the characteristics of the liquid lens shown in FIGS. 4a and 4b depending on a change in temperature. Specifically, FIG. 5a is a cross-sectional view of the liquid lens at room temperature, and FIG. 5b is a cross-sectional view of the liquid lens at a high temperature.

As described above, the cavity, which is defined by the second plate 16, the first plate 14, and the third plate 12, is filled with two liquids having different properties from each other. The liquids expand with an increase in temperature (e.g. thermal expansion).

The two liquids charged in the cavity may include an electrolytic (or conductive) liquid and a non-electrolytic (or non-conductive) liquid. The degree of thermal expansion of a liquid may be larger than that of a solid. As the temperature of a material increases, the movement of molecules becomes more active, and the distance between the molecules increases, which may result in an increase in the volume of the material. In particular, since molecules of a liquid move more freely than molecules of a solid, a liquid may thermally expand more than a solid for the same change in temperature. A representative example of an electrolytic (conductive) liquid used in a liquid lens is water ($H_2O$). In the case of water, the volume thereof increases when the temperature rises within the range of 4° C. or higher, but the volume thereof decreases when the temperature rises within the range below 4° C. The coefficient of thermal expansion of water is known to be about 1.8 (unit: $10^{-5}/°$ C.).

Referring to FIG. 5a, if there is no change in the volume of the two liquids in the cavity at room temperature, the light incident through the second plate 16 may be refracted by the interface 44 formed by the two liquids in the cavity, and may pass through the third plate 12. In this case, it is possible to control the liquid lens in a desired direction by applying electrical energy to the liquid lens to change the curvature of the interface 44.

Referring to FIG. 5b, the second plate 16 may swell due to a change in the volume of the two liquids in the cavity at a high temperature. Since the center portion (the center region) and the peripheral region of the second plate 16 are not bonded to the first plate 14 and the thickness of each of the center portion and the peripheral region of the second plate is relatively small, the second plate 16 may bend in response to the expansion of the two liquids, i.e. an increase in the volume thereof, or the contraction of the two liquids due to a change in temperature.

On the other hand, the third plate 12 may not swell despite a change in temperature. Further, even when the third plate 12 swells according to a change in temperature, the degree to which the third plate 12 swells may be small compared to the second plate 16. This is because the contact area between the third plate 12 and the liquid may be smaller than the contact area between the second plate 16 and the liquid or because the thickness of the region of the second plate 16 that contacts and overlaps the liquid in the upward-and-downward direction or in the direction parallel to the optical axis may be smaller than the thickness of the region of the third plate 12 that contacts and overlaps the liquid in the upward-and-downward direction or in the direction parallel to the optical axis.

After the first plate 14, on which a plurality of electrode patterns is disposed, is secured on the third plate 12, an insulation layer (not shown) may be formed in order to prevent the electrode patterns from being exposed to the cavity. For example, one of two electrode patterns may be covered with the insulation layer, and only the other one may be exposed, thereby preventing the properties of the two liquids in the cavity from being changed. Even when the two liquids thermally expand in response to a change in temperature, the third plate 12 may hardly swell, but the second plate 16, which has low rigidity, may swell due to the insulation layer 72 formed on the first plate 14 and the third plate 12.

When the second plate 16 swells, light incident through the second plate 16 may be refracted by the curvature generated in the second plate 16, separately from the interface 44, the curvature of which is controlled using electrical energy. In this case, the curvature generated in the second plate 16 may not be considered when designing the liquid lens, and the control of the focal length according to the coefficients of thermal expansion of the two liquids depending on a change in temperature may not be achieved.

FIG. 6a is a view showing one example of a change in the diopter of a solid lens depending on a change in temperature and a liquid lens for compensating for the change in the diopter. FIG. 6b is a view showing another example of a change in the diopter of a solid lens depending on a change in temperature and a liquid lens for compensating for the change in the diopter.

Referring to FIG. 6a, the solid lens may refer to a solid lens group, that is, the portion of the entire lens assembly (e.g. 22 in FIG. 2) other than the liquid lens, and may include at least one solid lens. That is, in the example shown in FIG. 2, the solid lens may include the first lens unit 100 and the second lens unit 200, and may exclude the liquid lens unit 300.

Therefore, a change in the diopter of the solid lens depending on a change in temperature may be represented as the sum of a change in the diopter of the first lens unit 100 and a change in the diopter of the second lens unit 200. Since a diopter has an inverse relationship with a focal length, a change in diopter may mean a change in focal length.

Here, a change in the diopter of the solid lens depending on a change in temperature may be made according to various factors such as the material, size, and shape of each lens included in the solid lens. For example, a solid lens including a glass lens may have a small change in diopter depending on a change in temperature compared to a solid lens designed by combining only plastic lenses.

An example shown in FIG. 6a relates to a solid lens, which is designed by combining only plastic lenses and has a relatively large change in diopter depending on a change in temperature, and an example shown in FIG. 6b relates to a solid lens, which includes a glass lens and has a relatively small change in diopter depending on a change in temperature.

Ideally, the entire lens has a uniform diopter irrespective of the temperature of use. It is desirable that the focal length and shape of the liquid lens vary only in accordance with active control of a diopter regardless of temperature.

However, as can be seen in FIGS. 6a and 6b, the diopter of the solid lens decreases to a greater or lesser extent with an increase in temperature. In contrast, the diopter of the liquid lens increases to a greater or lesser extent with an increase in temperature.

Therefore, when a change in the diopter of the solid lens depending on a change in temperature is determined, the liquid lens may be designed so that the liquid lens offsets the change in the diopter of the solid lens depending on a change in temperature. That is, when the liquid lens is designed so that a change in the diopter thereof depending on a change in temperature offsets a change in the diopter of the solid lens depending on a change in temperature, the diopter of the entire lens, which includes the solid lens and the liquid lens, may be uniform regardless of a change in temperature. Further, although not uniform, a change in the diopter of the entire lens, which includes the solid lens and the liquid lens, may be no more than 1 diopter within a temperature range of −40 degrees Celsius to 60 degrees Celsius. For example, a change in the diopter of the entire lens within a temperature range of 25 degrees Celsius to 60 degrees Celsius may be made within a range of ±0.5 diopters. In addition, within a temperature range of 25 degrees Celsius to 60 degrees Celsius, the absolute value of variation in the diopter of the liquid lens may be greater than the absolute value of variation in the diopter of the solid lens.

A change in the diopter of the liquid lens depending on a change in temperature may be determined based on the proportional relationship between the liquid volume LV, which is the sum of the volume of the conductive liquid 25 and the volume of the non-conductive liquid 24, and the cross-sectional area A of the contact interface between the second plate 16 and the liquid. The cross-sectional area A of the contact interface between the second plate 16 and the liquid may be substantially the same as a cross-sectional area of the lower surface of the second plate 16 that contacts the liquid or a cross-sectional area of the upper surface of the liquid that contacts the second plate 16.

That is, a change in the diopter of the liquid lens depending on a change in temperature may be determined using Equation 1 below.

$$A = k * LV \quad \text{[Equation 1]}$$

Here, A represents the cross-sectional area of the contact interface between the second plate 16 and the liquid (or the area of the lower surface of the second plate 16 when the second plate 16 is in a non-expanded state (or in a flat state)), the unit of which may be $mm^2$, and LV represents the liquid volume, the unit of which may be $mm^3$. In addition, k represents a crystal constant, the unit of which may be 1/mm. In general, k may range from 3 to 15, but the disclosure is not limited thereto.

Further, a change in the diopter of the liquid lens depending on a change in temperature may be determined according to the crystal constant k.

When the design of the solid lens in the lens assembly, except for the liquid lens, is completed, the change in the diopter of the solid lens depending on a change in temperature may be determined. In addition, the cross-sectional area A of the peripheral region 46 of the liquid lens shown in FIG. 4b may be determined based on the location at which the liquid lens is disposed relative to the solid lens (e.g. the location between the first lens unit and the second lens unit at which the liquid lens is inserted, as shown in FIG. 2), a required effective lens region, and the size of the solid lens.

When the crystal constant corresponding to the change in the diopter of the liquid lens depending on a change in temperature, which is capable of offsetting the change in the diopter of the solid lens depending on a change in temperature, is K1, the liquid volume may be calculated by putting the determined cross-sectional area A1 and the crystal constant K1 into Equation 1.

In another embodiment, the liquid volume may be determined first, and thereafter the cross-sectional area may be determined.

That is, the crystal constant corresponding to the change in the diopter of the liquid lens depending on a change in temperature, which is capable of offsetting the change in the diopter of the solid lens depending on a change in temperature, may be determined, and thereafter the liquid lens may be designed so as to satisfy the proportional relationship between the cross-sectional area and the liquid volume based on the crystal constant. As a result, the change in the diopter of the solid lens depending on a change in temperature may be offset, and thus the diopter of the entire lens may be uniform regardless of temperature. In other words, when the ratio of the cross-sectional area to the liquid volume is the same as the crystal constant corresponding to the change in the diopter of the solid lens depending on a change in temperature, the change in the diopter of the liquid lens depending on a change in temperature may be the same as the change in the diopter of the solid lens depending on a change in temperature.

In FIG. 6a, when the change in the diopter of the solid lens depending on a change in temperature is −0.01 diopters per degree and the cross-sectional area A is determined to be 12.6 mm$^2$, if the liquid volume LV is determined so as to have a relationship of A=15 LV, the change in the diopter of the liquid lens depending on a change in temperature may be 0.01 diopters per degree.

In addition, in FIG. 6b, when the change in the diopter of the solid lens depending on a change in temperature is −0.33 diopters per degree and the cross-sectional area A is determined to be 12.6 mm$^2$, if the liquid volume LV is determined so as to have a relationship of A=3 LV, the change in the diopter of the liquid lens depending on a change in temperature may be 0.33 diopters per degree.

When the change in the diopter of the solid lens depending on a change in temperature, which constitutes one optical system together with the liquid lens, is determined, the liquid lens may be designed to have a cross-sectional area and a liquid volume that are suitable for offsetting the change in the diopter of the solid lens depending on a change in temperature. This may be possible because the variation in the diopter of the solid lens (or the direction in which the diopter changes) depending on a change in temperature is opposite the variation in the diopter of the liquid lens (or the direction in which the diopter changes) depending on a change in temperature.

A lens assembly or a camera module, which includes an optical system including a solid lens and a liquid lens, may be designed so as to satisfy the following equation.

$$3\ LV \leq A \leq 15\ LV \quad \text{[Equation 2]}$$

When A is less than 3 LV, the variation in the diopter of the liquid lens depending on a change in temperature may be too large. When the variation in the diopter of the liquid lens is greater than the variation in the diopter of the solid lens, this may lead to deterioration in the performance of the entire optical system. That is, when the variation in the diopter of the liquid lens depending on a change in temperature is different from the variation in the diopter of the solid lens depending on a change in temperature, the overall focal length changes. When A is less than 3 LV, the overall focal length may change out of the range of the depth of focus required for the entire lens, which may lead to deterioration in the resolution of the image.

When A is greater than 15 LV, the cross-sectional area of the liquid lens may become larger than necessary, and thus the size of the lens assembly or the camera module may become larger than necessary. In addition, the ratio of thickness to area may decrease, and thus the maximum variation in the diopter of the liquid lens may decrease, which may make it difficult to realize sufficient focus adjustment.

The liquid lens according to the embodiment is designed so as to have temperature-dependent diopter change characteristics capable of offsetting a change in the diopter of the solid lens group depending on a change in temperature. As a result, the diopter of the entire lens may be maintained uniform regardless of temperature, or the variation in the diopter of the entire optical system may be maintained to a level within the range within which the performance of the entire optical system is not affected by the variation.

The above-described liquid lens may be included in a camera module. The camera module may include a lens assembly including a liquid lens mounted in a housing and at least one solid lens that may be disposed on the front surface or the rear surface of the liquid lens, an image sensor converting an optical signal transmitted through the lens assembly into an electrical signal, and a control circuit supplying a driving voltage to the liquid lens.

Although only a limited number of embodiments have been described above, various other embodiments are possible. The technical contents of the above-described embodiments may be combined into various forms as long as they are not incompatible with one another, and thus may be implemented in new embodiments.

For example, an optical device (or an optical instrument) including the camera module including the above-described liquid lens may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

It will be apparent to those skilled in the art that various changes in form and details may be made without departing from the spirit and the essential characteristics of the disclosure set forth herein. Accordingly, the above detailed description is not intended to be construed as limiting the disclosure in all aspects and to be considered by way of example. The scope of the disclosure should be determined by reasonable interpretation of the accompanying claims, and all equivalent modifications made without departing from the disclosure should be included in the scope of the disclosure.

MODE FOR INVENTION

Various embodiments have been described in the best mode for carrying out the disclosure.

INDUSTRIAL APPLICABILITY

A liquid lens, a camera module including the same, and an optical device according to the embodiments may be used in portable devices such as, for example, camera/video devices, telescopic devices, microscopic devices, an interferometer, a photometer, a polarimeter, a spectrometer, a reflectometer, an auto-collimator, a lens-meter, a smartphone, a laptop computer, and a tablet computer.

The invention claimed is:

1. A liquid lens forming one optical system together with a solid lens, the liquid lens comprising:
   a first plate comprising a cavity formed therein to accommodate a conductive liquid and a non-conductive liquid therein;
   a first electrode disposed on the first plate;
   a second electrode disposed under the first plate;
   a second plate disposed on the first electrode; and
   a third plate disposed under the second electrode,
   wherein a total volume (LV) of the conductive liquid and the non-conductive liquid and a cross-sectional area (A) of a contact interface at which the second plate contacts the conductive liquid satisfy Equation 1 below:

$$k_1 \text{ LV} \leq A \leq k_2 \text{ LV}, \qquad \text{[Equation 1]}$$

where $k_1=3/\text{mm}$, $k_2=15/\text{mm}$, A is measured in $\text{mm}^2$, and LV is measured in $\text{mm}^3$.

2. The liquid lens according to claim 1, wherein, when a temperature increases, a diopter of the liquid lens changes in a direction opposite a direction in which a diopter of the solid lens changes.

3. The liquid lens according to claim 2, wherein the diopter of the solid lens decreases with an increase in temperature, and
   wherein the diopter of the liquid lens increases with an increase in temperature.

4. The liquid lens according to claim 1, wherein the cross-sectional area (A) is an area calculated when the second plate is flat.

5. The liquid lens according to claim 1, wherein variation in diopter of an entire lens, comprising the liquid lens and the solid lens, is no more than 1 diopter within a temperature range of 25 degrees Celsius to 60 degrees Celsius.

6. The liquid lens according to claim 1, wherein the cross-sectional area A of the contact interface is a cross-sectional area of a lower surface of the second plate that contacts the conductive liquid.

7. The liquid lens according to claim 1, wherein the cross-sectional area A of the contact interface is a cross-sectional area of an upper surface of the conductive liquid that contacts the second plate.

8. The liquid lens according to claim 1, wherein, in case that a change in a diopter of the solid lens depending on a change in temperature is −0.01 diopters per degree and that the cross-sectional area A is determined to be 12.6 $\text{mm}^2$, if the liquid volume LV is determined so as to have a relationship of $A=k_2$ LV, a change in a diopter of the liquid lens depending on a change in temperature is 0.01 diopters per degree.

9. The liquid lens according to claim 8, wherein the solid lens includes plastic lenses.

10. The liquid lens according to claim 1, wherein, in case that a change in a diopter of the solid lens depending on a change in temperature is −0.33 diopters per degree and that the cross-sectional area A is determined to be 12.6 $\text{mm}^2$, if the liquid volume LV is determined so as to have a relationship of $A=k_1$ LV, a change in a diopter of the liquid lens depending on a change in temperature is 0.33 diopters per degree.

11. The liquid lens according to claim 10, wherein the solid lens includes a glass lens.

12. The liquid lens according to claim 1, wherein the total volume (LV) is determined using a predetermined crystal constant and a predetermined cross-sectional area A, in order to satisfy the Equation 1.

13. The liquid lens according to claim 1, wherein the cross-sectional area A is determined using a predetermined crystal constant and a predetermined total volume (LV), in order to satisfy the Equation 1.

14. A lens assembly, comprising:
   a solid lens; and
   a liquid lens forming one optical system together with the solid lens, the liquid lens having a configuration in which an interface between a conductive liquid and a non-conductive liquid is controlled,
   wherein the liquid lens comprises:
     a first plate comprising a cavity formed therein to accommodate the conductive liquid and the non-conductive liquid therein;
     a first electrode disposed on the first plate;
     a second electrode disposed under the first plate;
     a second plate disposed on the first electrode; and
     a third plate disposed under the second electrode,
   wherein a diopter of the solid lens decreases with an increase in temperature,
   wherein a diopter of the liquid lens increases with an increase in temperature, and
   wherein a total volume (LV) of the conductive liquid and the non-conductive liquid and a cross-sectional area (A) of a contact interface at which the second plate contacts the conductive liquid satisfy Equation 1 below:

$$k_1 \text{ LV} \leq A \leq k_2 \text{ LV}, \qquad \text{[Equation 1]}$$

where $k_1=3/\text{mm}$, $k_2=15/\text{mm}$, A is measured in $\text{mm}^2$, and LV is measured in $\text{mm}^3$.

15. The lens assembly according to claim 14, wherein, within a temperature range of 25 degrees Celsius to 60 degrees Celsius, an absolute value of variation in the diopter of the liquid lens is greater than an absolute value of variation in the diopter of the solid lens.

16. The lens assembly according to claim 14, wherein variation in diopter of an entire lens, comprising the liquid lens and the solid lens, is no more than 1 diopter within a temperature range of 25 degrees Celsius to 60 degrees Celsius.

17. A camera module, comprising:
   the lens assembly of claim 14; and
   a control circuit configured to control an interface between the conductive liquid and the non-conductive liquid.

18. The lens assembly according to claim 14, wherein, with an increase in temperature, an amount of decreasing a diopter of the solid lens is the same as an amount of increasing a diopter of the liquid lens.

19. The lens assembly according to claim 14, wherein the cross-sectional area A of the contact interface is a cross-sectional area of a lower surface of the second plate that contacts the conductive liquid or a cross-sectional area of an upper surface of the conductive liquid that contacts the second plate.

* * * * *